Dec. 29, 1931. F. D. A. MALUM 1,839,108
ROTARY PLATEN TYPEWRITING MACHINE
Filed Feb. 21, 1927 16 Sheets-Sheet 1
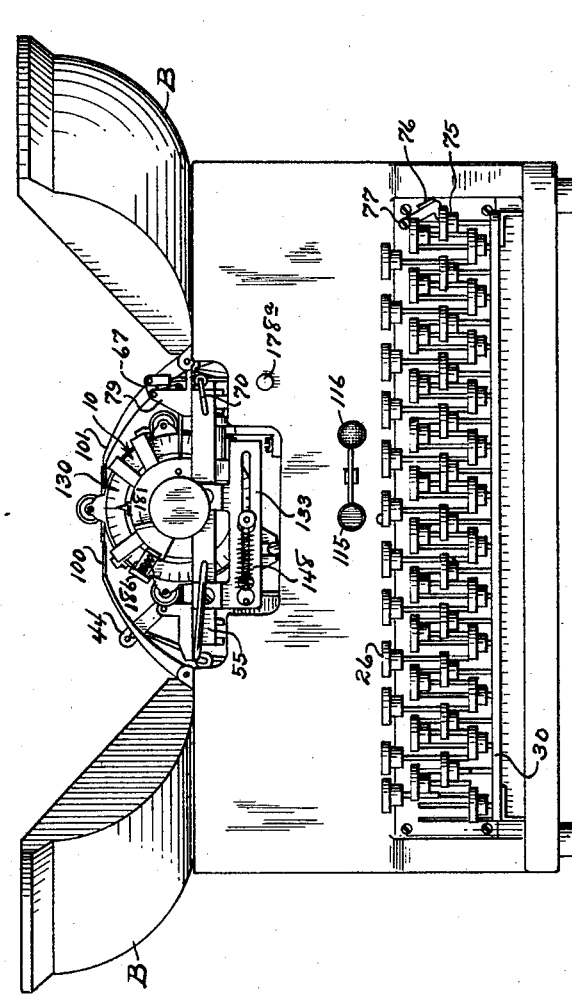
Frank D. A. Malum
INVENTOR
BY Victor J. Evans
ATTORNEY
WITNESS: John Duncan

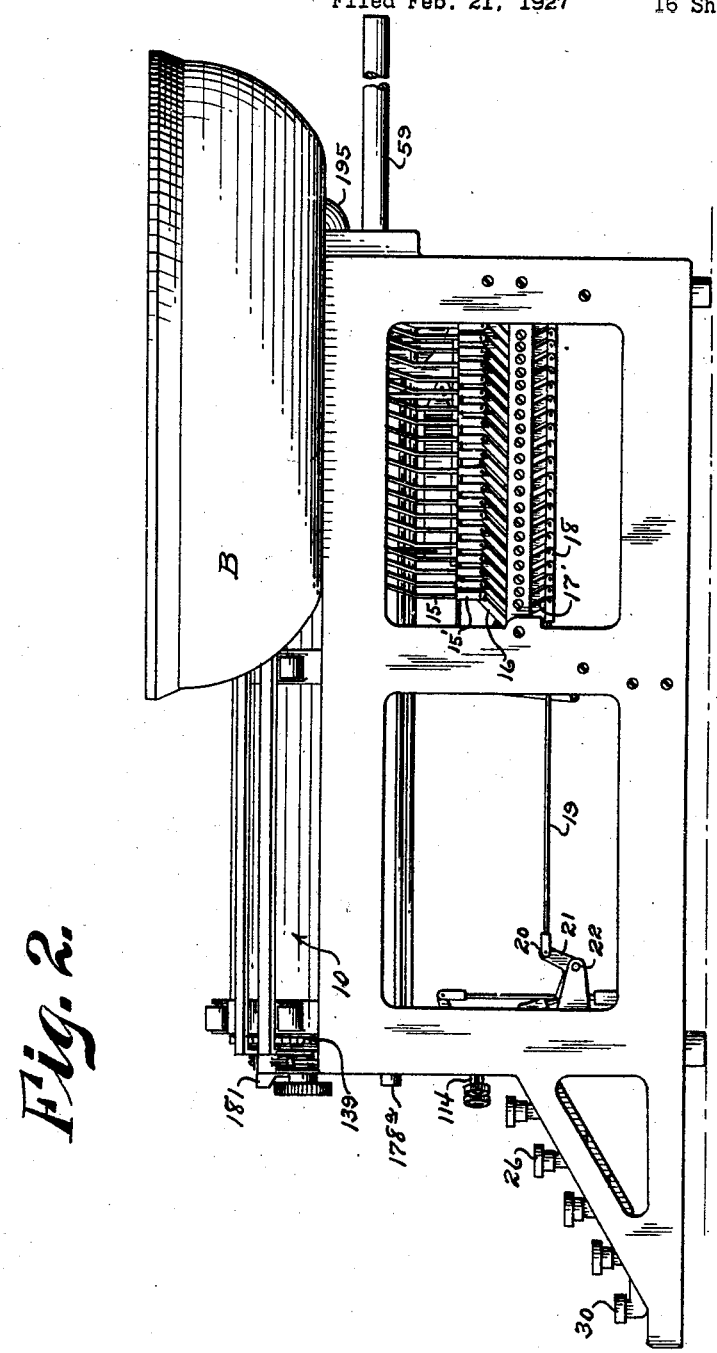

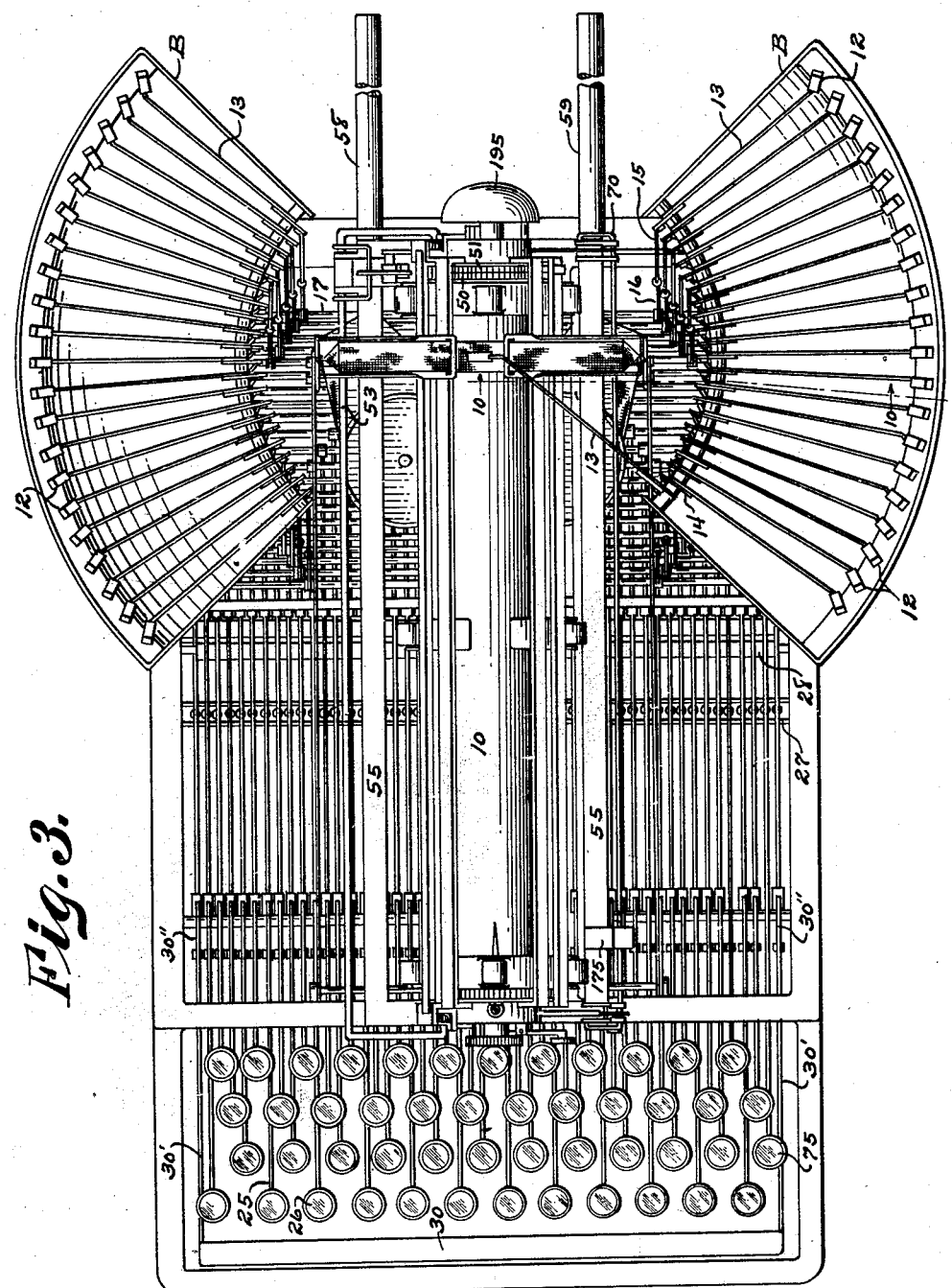

Dec. 29, 1931.  F. D. A. MALUM  1,839,108
ROTARY PLATEN TYPEWRITING MACHINE
Filed Feb. 21, 1927   16 Sheets-Sheet 4
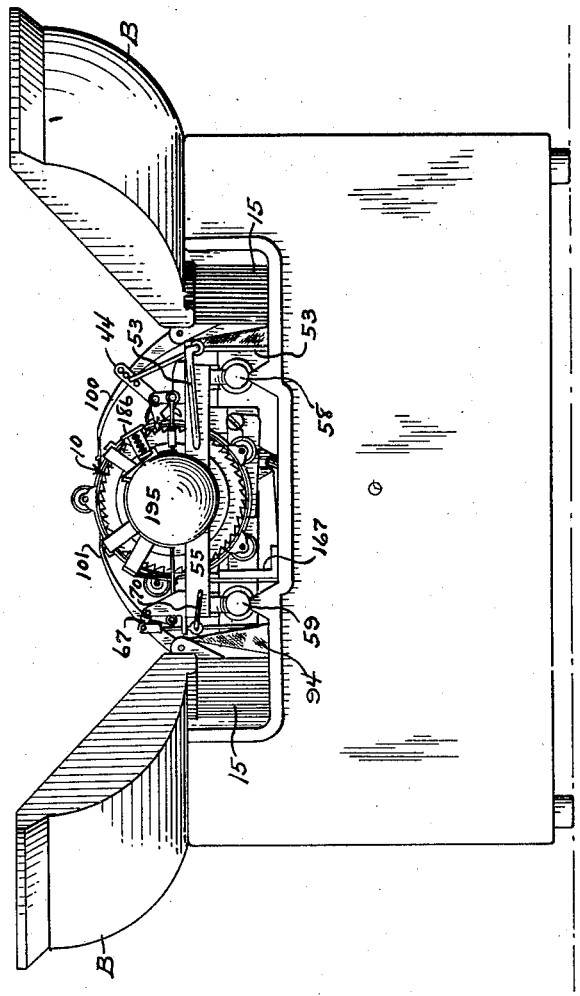
Frank D. A. Malum
INVENTOR
BY Victor J. Evans
ATTORNEY
WITNESS 

Dec. 29, 1931.　　　F. D. A. MALUM　　　1,839,108
ROTARY PLATEN TYPEWRITING MACHINE
Filed Feb. 21, 1927　　16 Sheets-Sheet 5
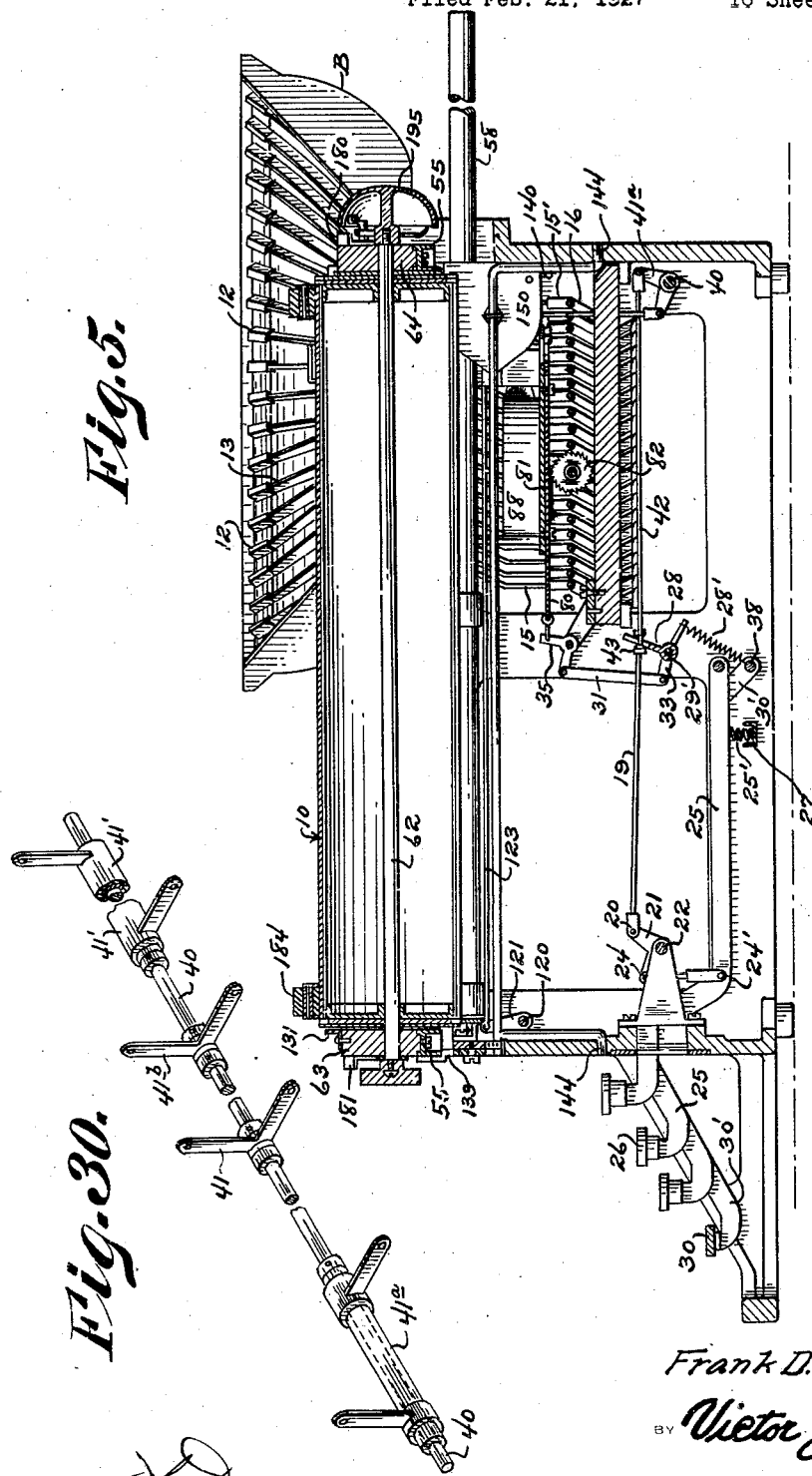

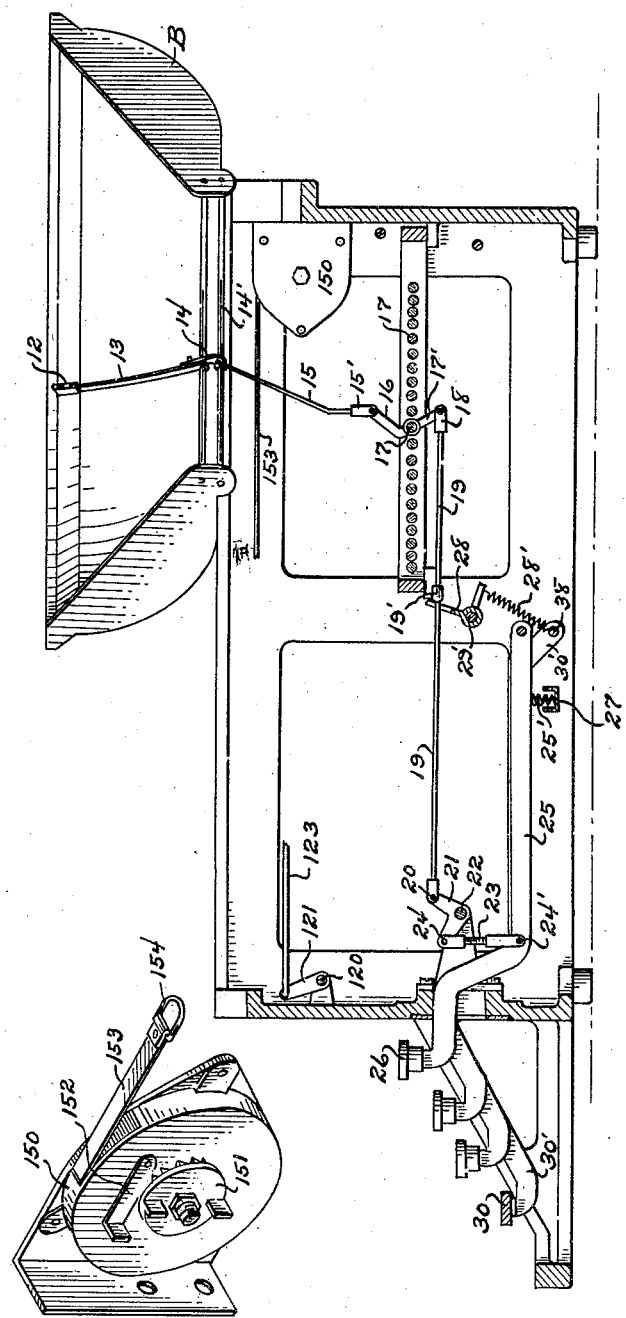

Dec. 29, 1931. F. D. A. MALUM 1,839,108
ROTARY PLATEN TYPEWRITING MACHINE
Filed Feb. 21, 1927 16 Sheets-Sheet 7
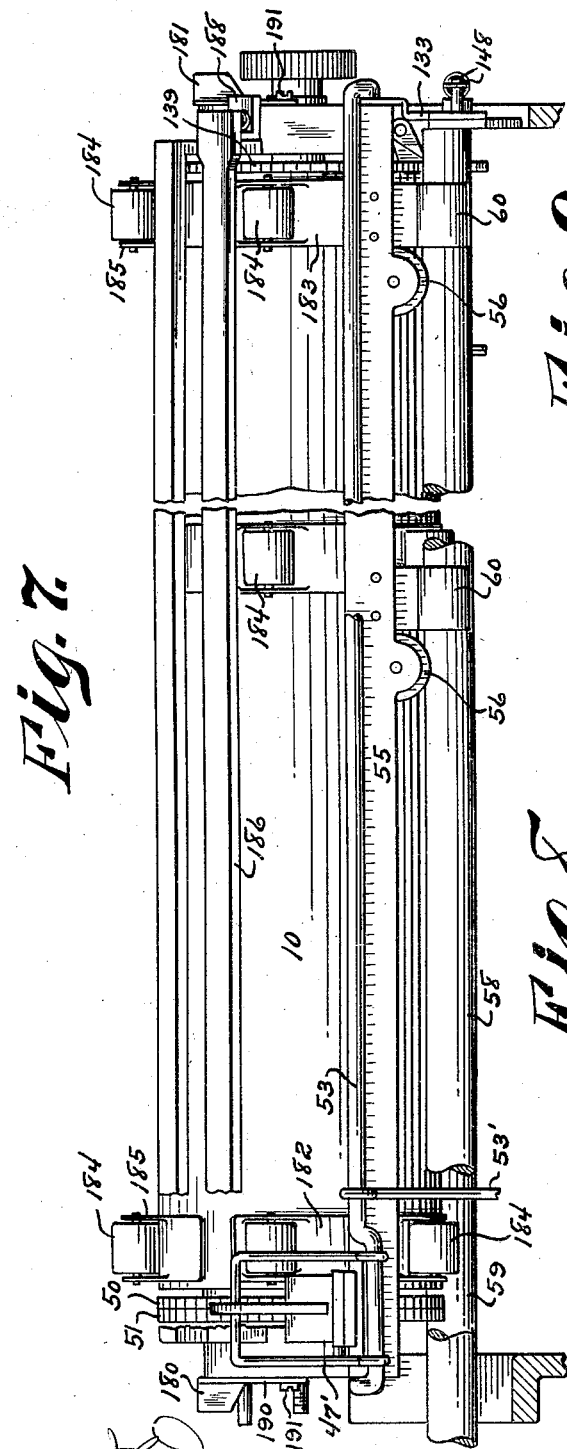
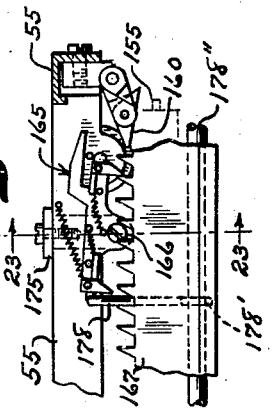
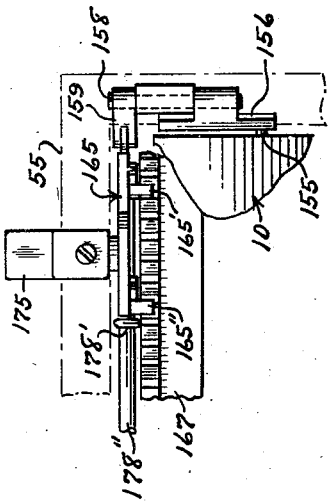
Frank D. A. Malum
INVENTOR
BY Victor J. Evans
ATTORNEY
WITNESS:

Dec. 29, 1931.     F. D. A. MALUM     1,839,108
ROTARY PLATEN TYPEWRITING MACHINE
Filed Feb. 21, 1927     16 Sheets-Sheet 8

Frank D. A. Malum
INVENTOR
BY Victor J. Evans
ATTORNEY

WITNESS:

Dec. 29, 1931.　　　F. D. A. MALUM　　　1,839,108
ROTARY PLATEN TYPEWRITING MACHINE
Filed Feb. 21, 1927　　　16 Sheets-Sheet 9
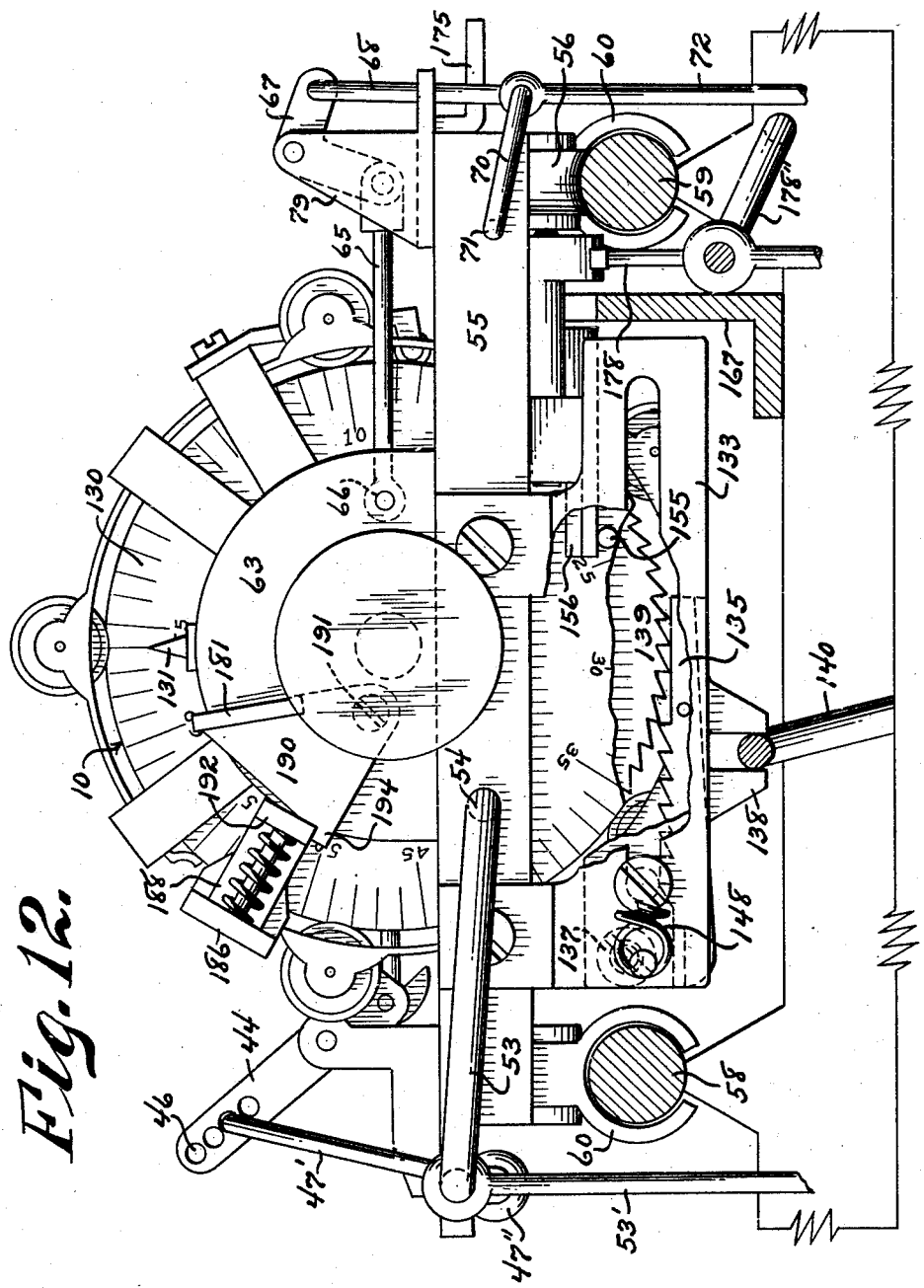
Fig. 12.
Frank D. A. Malum
INVENTOR
BY Victor J. Evans
ATTORNEY
WITNESS: 

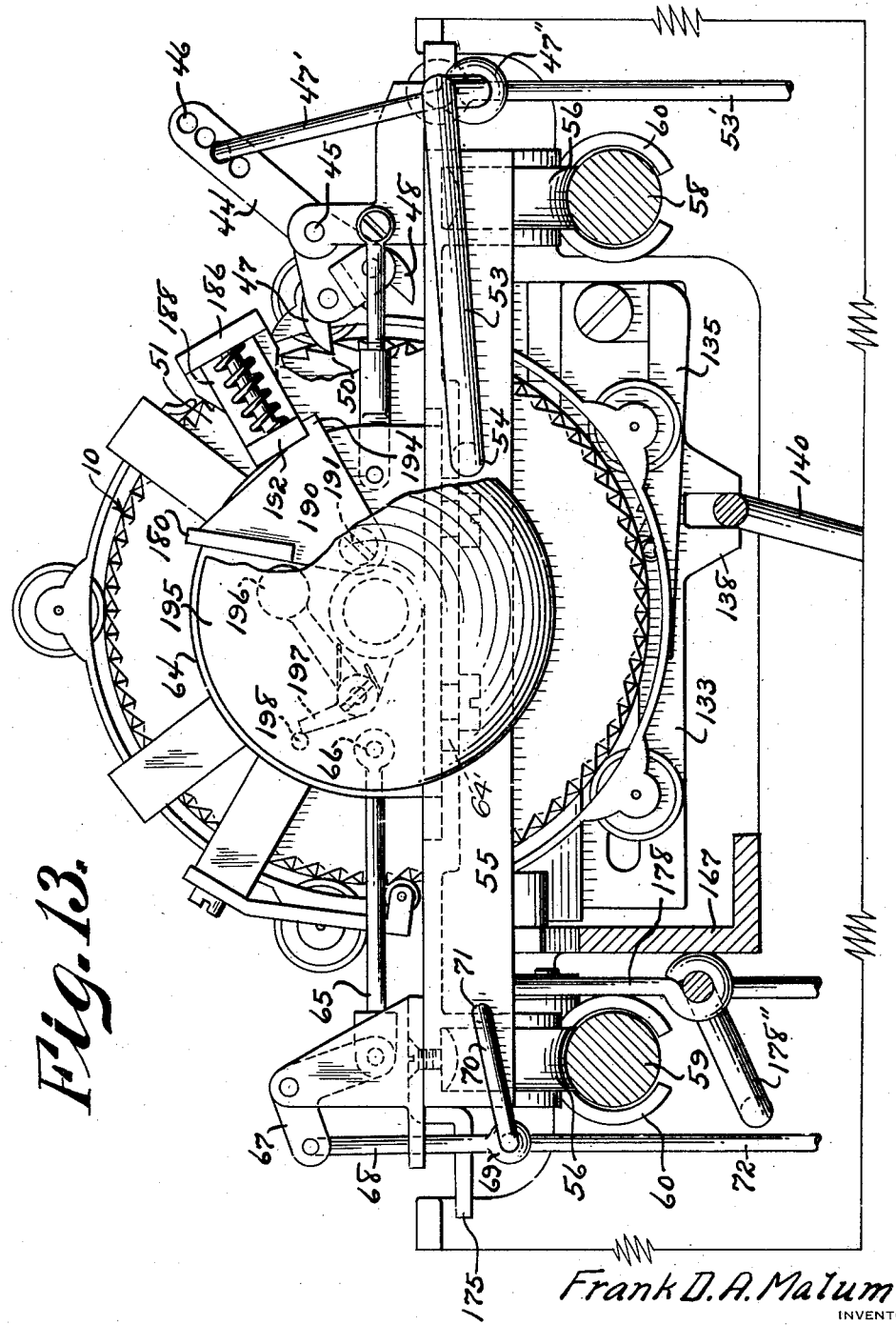

Dec. 29, 1931.  F. D. A. MALUM  1,839,108
ROTARY PLATEN TYPEWRITING MACHINE
Filed Feb. 21, 1927  16 Sheets-Sheet 11

Frank D. A. Malum
INVENTOR
BY Victor J. Evans
ATTORNEY

WITNESS:

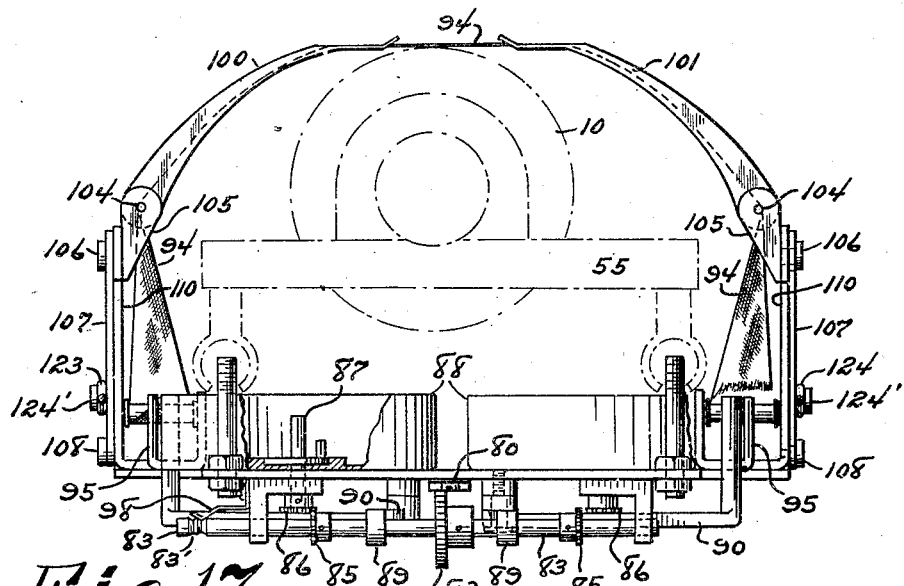
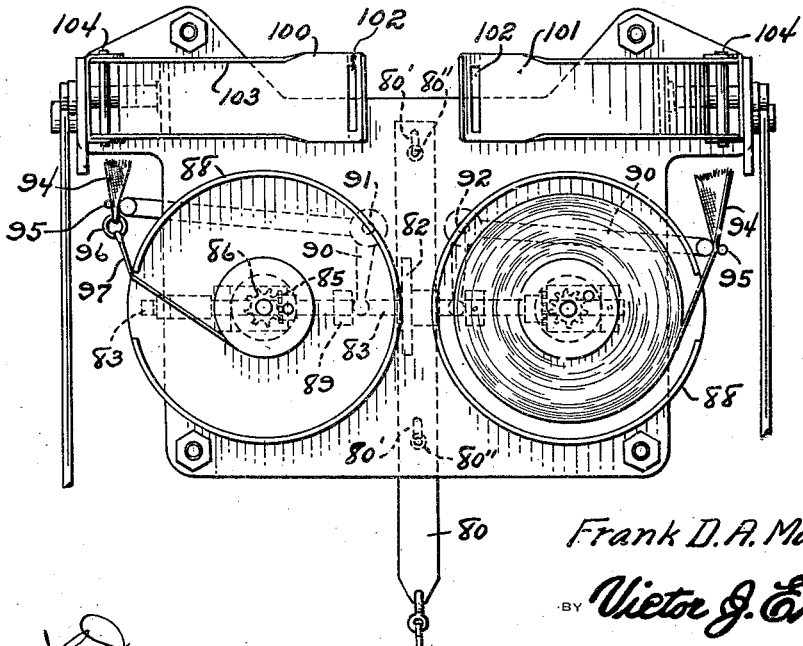

Dec. 29, 1931.　　　F. D. A. MALUM　　　1,839,108
ROTARY PLATEN TYPEWRITING MACHINE
Filed Feb. 21, 1927　　16 Sheets-Sheet 13

Frank D. A. Malum
INVENTOR
BY Victor J. Evans
ATTORNEY

WITNESS:

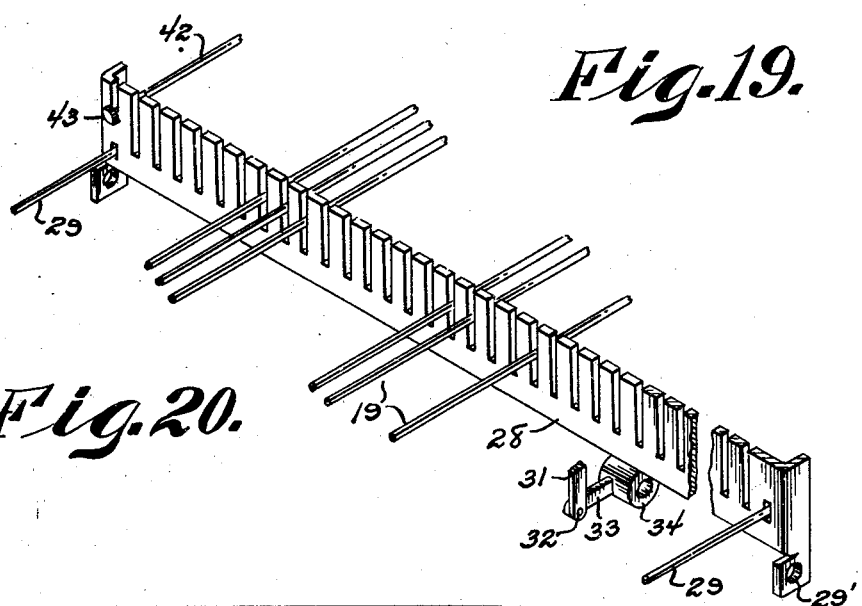
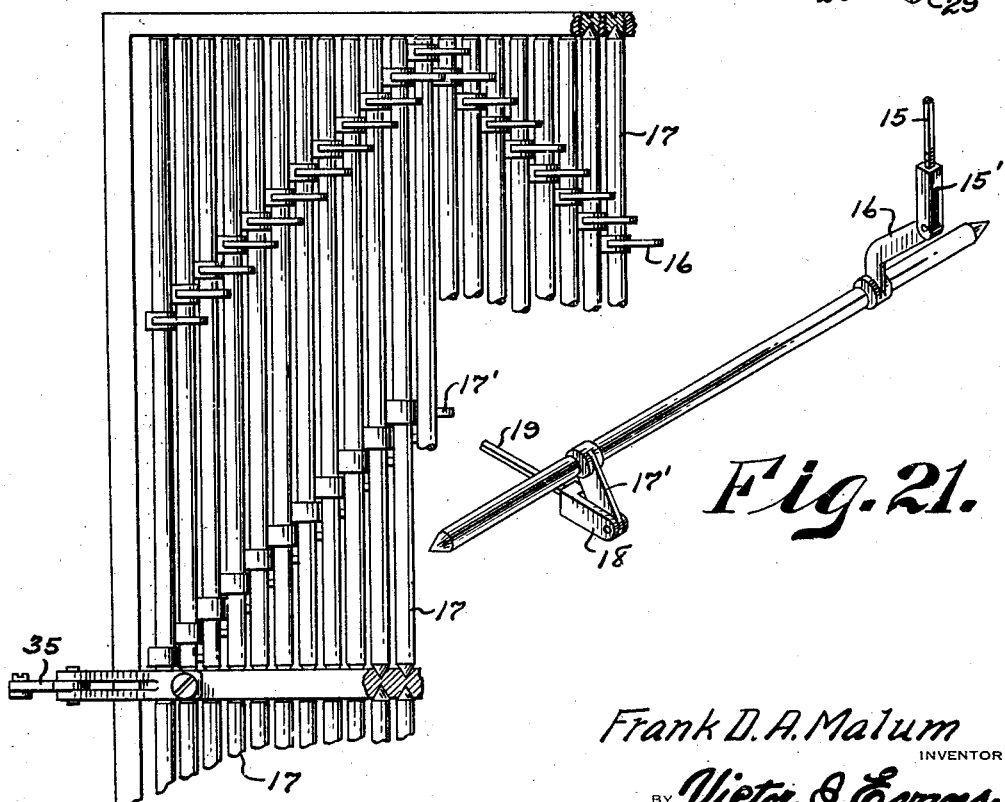

Dec. 29, 1931.  F. D. A. MALUM  1,839,108
ROTARY PLATEN TYPEWRITING MACHINE
Filed Feb. 21, 1927   16 Sheets-Sheet 16
*Fig. 24.*
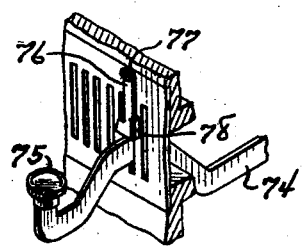
*Fig. 25.*
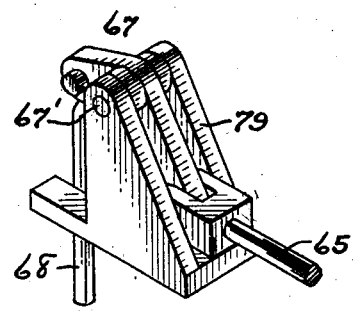
*Fig. 26.*
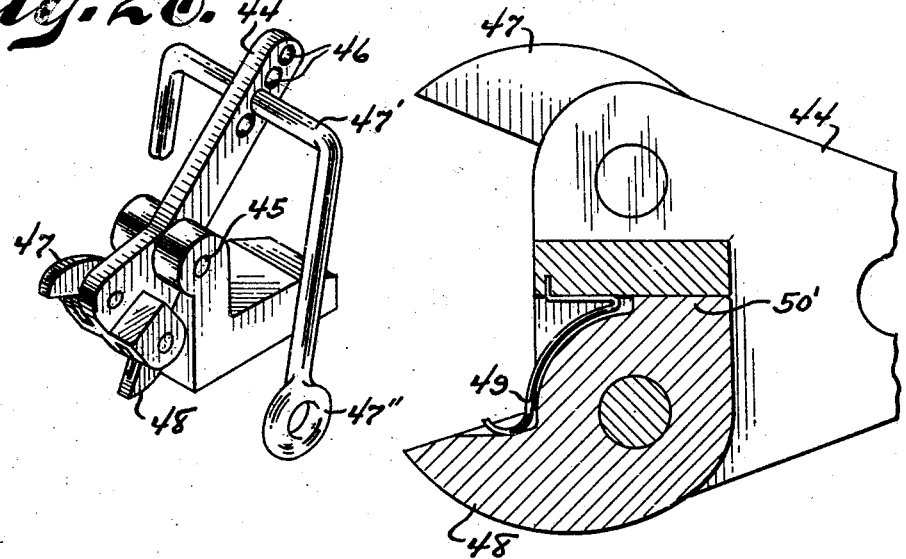
*Fig. 27.*
*Fig. 28.*
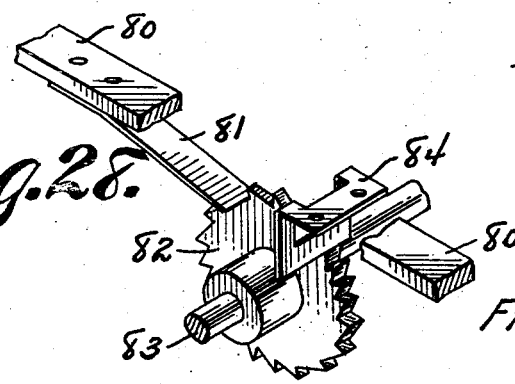
Frank D. A. Malum
INVENTOR
BY *Victor J. Evans*
ATTORNEY
WITNESS: *Jno Donovan*

Patented Dec. 29, 1931

1,839,108

UNITED STATES PATENT OFFICE

FRANK D. A. MALUM, OF REDONDO BEACH, CALIFORNIA, ASSIGNOR OF TWO-THIRDS TO BELA H. COLEGROVE, OF REDONDO BEACH, CALIFORNIA

ROTARY PLATEN TYPEWRITING MACHINE

Application filed February 21, 1927. Serial No. 169,974.

The object of this invention is to provide a typewriting machine in which the platen is rotatable about an axis extending from the front to the rear of the machine and the line is written as the platen rotates in a step by step movement incident to the operation of the key levers, the type bars being arranged in banks or series, on opposite sides of the machine and movable toward the center and into operative relation to the platen.

A further object is to provide for the line spacing in a machine of this type, by moving the carriage longitudinally of the axis of the platen, positioned as indicated.

A further object is to provide a particular type bar action suitable for a machine of this class.

A further object is to provide particular mechanism for effecting the letter spacing.

A further object is to provide for shifting from lower case to upper case, and to provide ribbon controlling mechanism to suit the requirements of the machine, and adapted to permit of shifting the ribbon in changing the color of the impression to be made by the type.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view of the machine in front elevation.

Figure 2 is a view in side elevation.

Figure 3 is a top plan view.

Figure 4 is a view in rear elevation.

Figure 5 is a vertical section longitudinally of the platen.

Figure 6 is a view in section, in the same direction as in Figure 5, but showing only the type bar action.

Figure 7 is a view of the carriage in side elevation.

Figure 8 is a top plan view showing the carriage escapement mechanism.

Figure 9 is a view in side elevation, based on the same subject matter as in the case of Figure 8.

Figure 12 is an end view of the carriage, with parts broken away, the view being from the front and showing mechanism for completing a line for releasing the mechanism incident to a shift to the next line.

Figure 13 is a view in elevation showing the rear end of the carriage.

Figure 16 is a view in front elevation, showing the ribbon mechanism.

Figure 17 is a top plan view of the same structure.

Figure 19 is a perspective view of a notched bar controlled by individual type key connecting rods, for producing letter spacing.

Figure 20 is a fragmentary plan view showing a portion of the series of rock shafts controlled directly by the keys.

Figure 21 is a detail view in perspective, showing one of the rock shafts.

Figure 24 is a perspective view showing a lock for the upper case shift key lever.

Figure 25 is a perspective view showing the upper case shift lock.

Figure 26 shows the letter spacing lever, in perspective.

Figure 27 shows on a larger scale, the subject matter of Figure 26, or a part thereof.

Figure 28 is a fragmentary view showing, in perspective, the ribbon feeding mechanism.

Figure 29 is a perspective view, showing the spring for the carriage.

Figure 30 shows two inner bell crank levers and two outer sleeves with arms thereon, also serving as bell crank levers.

Figure 10:
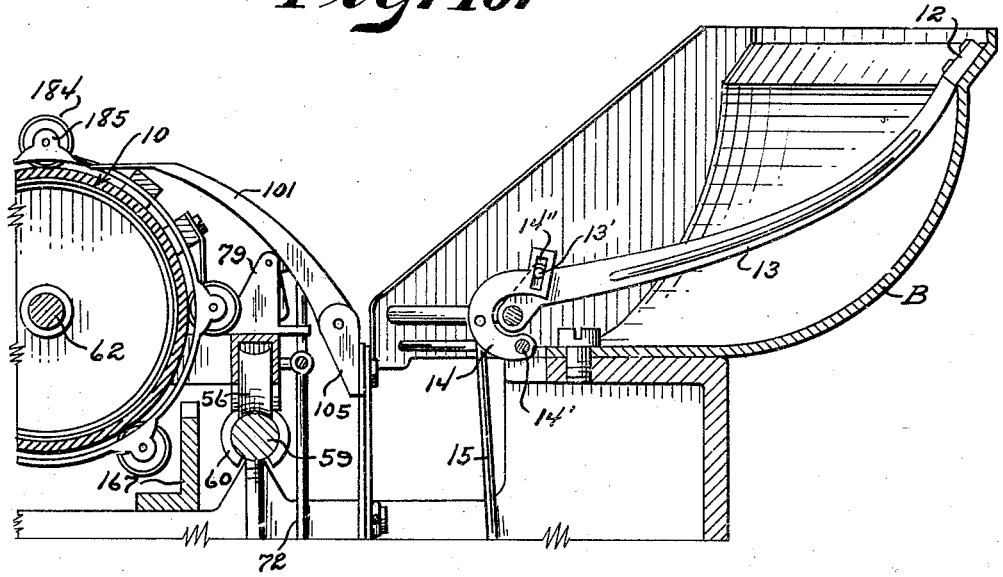
Figure 10 is a view in section showing the type bar action, the normal position being illustrated.
Figure 11:
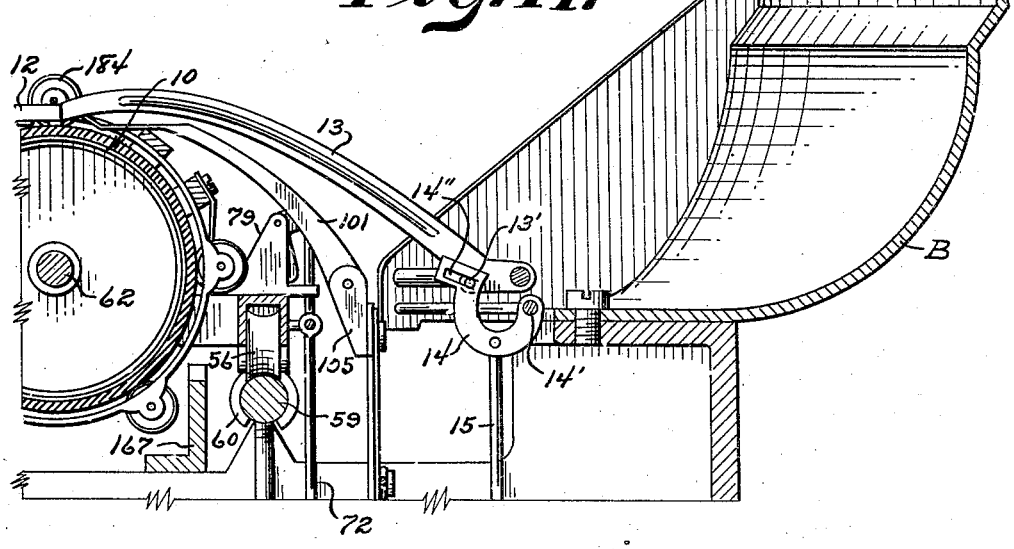
Figure 11 is a similar view, but showing the operative position.

The platen 10 is mounted to rotate on an axis, or about an axis, extending thru the central portion of the machine, and from front to rear, instead of from side to side, as in the machines in common use. The keys are arranged in the usual manner, and the type bars are arranged in two banks or series, on opposite sides of the machine and on opposite sides of the platen. The individual elements 12 carry two type, providing for the upper and lower case of each letter of the alphabet, and providing for the usual additional characters, such as numerals, marks of punctuation, etc. These elements 12, constituting type blocks, are carried by type bars 13, and connected with the latter are links or the like 14, of Figures 6, 10, 11, controlled by rods 15. The links 14 are pivotally mounted with reference to a curved bar or axial member 14', and elements 14 are slotted at 14" for cooperation with pin 13' on each type bar 13. The position of the type bar at rest, is illustrated in Figure 10, and the operative position is shown in Figure 11. The type bars in normal position, are within the basket B on each side of the machine.

These rods 15 are connected with bell crank levers 16 by means of the connecting elements 15' of Figure 21 and elsewhere, and said bell crank levers 16 are carried by the transverse shaft 17 arranged as in Figure 20, and shown more fully in Figure 3.

Each shaft 17 carries an arm 17' rigid therewith, the latter being pivotally connected by the device 18 of usual construction with horizontal longitudinal rod 19, pivoted at 20 to angle levers or bell crank levers, such as 21, the latter being adapted to rock about the axis 22.

Connected with angle levers or elements 21 are adjustable stems or the like 23, pivoted at 24, and pivoted at 24' to key lever or levers 25, each carrying a key such as 26.

Rods 19 each pass thru slotted bar or bail 28, shown in Figures 6 and 19 and elsewhere, and bar 28 is pivoted at 29' for rocking movement, the rods 19 each carrying a collar 19' producing that movement, and providing for letter spacing when the keys are depressed and rods 19 move forwardly. The key levers are returned to normal position by springs such as 25' mounted in transverse channel bar 27.

Bar 28 is also rocked by the movement of rods such as 29 controlled by main space bar 30 extending transversely of the machine, and at the front of the key board.

Links 31 are pivotally connected at 32 with arm 33 on collar 34 rigid with bar 28, this connection being shown especially in Figures 5 and 19. Bar 31 is pivotally connected with angle lever or bell crank lever 35 for operating the ribbon mechanism. It should be added that bar 28 is retained in or is returned to normal position by spring 28' connected with transverse shaft 38.

Extending transversely of the lower portion of the machine, towards the rear thereof, is a shaft 40 mounting a plurality of bell crank levers or angle levers such as 41a, one of these being illustrated in Figure 5, as having connection with rod 42 carrying an end collar 43, engaging the front portion of rocking bar or bail 28 of Figure 19 and elsewhere. Crank 41a produces letter spacing, by the partial rotation of the platen 10, about which the sheet of paper rolls, it being understood that the paper is not fed as in most standard machines, but maintains a fixed position with reference to the platen, with the side marginal portions overlapping, so that the beginning and ending of the lines of written matter are close to a given line extending longitudinally of the surface of the platen. The line spacing is effected by shifting the carriage and platen longitudinally of the axis of said platen, and the shift from lower case to upper case is produced by shifting the carriage laterally, or perpendicularly with reference to the longitudinal axis of the platen. Provision is made for completing a line which may be of less than normal length, so that the mechanism for shifting the carriage longitudinally for a new line may come into operation.

At the right of Figure 13, and at the left of Figure 12 means for effecting letter spacing are illustrated, and details are shown in Figures 26 and 27. A short lever or pivoted arm 44 moves about the axis 45, and is provided toward its outer end with a series of apertures 46 permitting of the mounting of the hook like element 47', shown in perspective in Figure 26, in a suitable adjusted position for swinging element 44 to the extent required to effect a particular letter spacing.

The inner end of arm 44 is provided with an enlarged portion, and mounts spring-held dogs 47 and 48, the former providing for forward letter spacing, and the latter for back spacing.

One of the springs is designated 49, and it will be understood that pawl or dog 47 is similarly mounted. Each of these elements 47 and 48 is provided with a shoulder 50', limiting movement of the pawl in one direction, and permitting movement in the opposite direction.

Pawl 47 engages the teeth of ratchet wheel 50, and provides for forward feeding upon the upward movement of hook 47', while movement of this element in the opposite direction causes pawl 48 to engage the teeth of ratchet wheel 51, for producing back spacing. Element 47' is provided with a loop or the like 47" engaged by the offset portion of bail 53 having its end portions mounted at 54. Since element 47' forms a part of the carriage mechanism, it is slidable with reference to the bail 53, in view of the connection at 47''. Bail 53 is controlled thru rod 53' and crank 41a.

The carriage includes the frame 55 mounted by means of rollers such as 56 for sliding movement on the carriage track elements 58 and 59, semi-circular guiding elements being designated 60.

The platen 10 is mounted by means of shaft 62 in carriage end blocks such as 63 and 64, slidable as at 64' in dotted lines in Figure 13, with reference to the carriage, and in order to shift the carriage laterally, with reference to the frame of the machine, or perpendicularly with reference to the axis of platen, in order to write upper case letters, I employ the mechanism shown at the right of Figure 12 and at the left of Figure 13, including a rod 65 connected with the carriage at 66, and shifted by means of bell crank lever 67 operated by a rod 68 having a loop member 69 slidable along bail 70 having its end portions mounted at 71 and being controlled by vertical rod 72. This element 72 is operated by one of the angle or bell crank levers 41' on transverse shaft 40 of Figure 5. Rod 72 is initially controlled by lever 74 of Figure 24, and the lever is controlled by key 75, a gravity locking device 76 being pivoted at 77 and including an offset portion 78 adapted for engagement by the operator, in throwing out the locking elements,—it being understood that when the key 75 is depressed, the locking device will move by gravity to engaging position, while upper case type are required during the operation of the machine. Key 75 constitutes therefore the upper case key of the machine.

The mounting of bell crank lever 67 of the upper case mechanism, is shown in perspective in Figure 25, this element 67 being pivoted at 67' and being mounted in bracket 79. Rod 65 operated by angle lever or bell crank lever 67, connects with the carriage at point 66, before mentioned.

The ribbon mechanism has been referred to, but not fully described, and in Figure 5 it will be observed that bell crank lever 35 connects with the slidable element 80, carrying rigidly therewith a flat spring 81 constituting a feeding pawl for cooperation with ratchet wheel 82 on shaft 83. A resilient retaining device cooperating with the ratchet wheel is designated 84.

Shaft 83, illustrated in Figures 16 and 17, and rotated as just described, carries toothed wheels such as 85 mounted rigidly on the shaft, so far as rotation is concerned, but being splined and movable into and out of engagement with toothed wheels 86 on the axial members 87 of the ribbon spools to be mounted in barrels or cases 88.

The collars 89, connected with wheels 85 by integrally formed elements or sleeves are engaged by bell crank levers 90 pivoted respectively at 91 and 92 and adapted to perform the function clearly indicated in Figure 17, wherein the ribbon shifting mechanism is illustrated, this view being read in connection with Figure 16 and Figure 28, and further in connection with Figure 5 showing the movement of the ribbon mechanism incident to the depression of one of the levers of the machine.

The ribbon 94 passes thru an element or elements at the end of each bell crank lever 90, this arrangement being shown at 95, and engagement is effected at this point when ring or loop member 96 connected with flexible element 97 comes to the position shown at the left of Figure 17, this constituting the end of the ribbon feed in one direction, it being understood that element 97 is connected with the hub portion of the spool which will carry the ribbon.

The engagement illustrated at 95 and 96 in Figure 17 produces the movement of bell crank lever 90 at the left, about the axis 91, and collar 89 on shaft 83 is thrown to the left in Figure 17, and carries with it the shaft 83 and wheel 85 at the left, which therefore comes into engagement with toothed wheel 86, also at the left, and places the left hand spool in operation for winding the ribbon thereon, from the spool at the right. Figure 16 shows that the spool last named is out of gear at this time, and free to rotate under the tension of the ribbon.

Shaft 83 is provided with annular grooves 83' either one of which may be engaged by the deflected spring 98 acting as a holding element, and preventing accidental longitudinal movement of the shaft.

Figure 18:
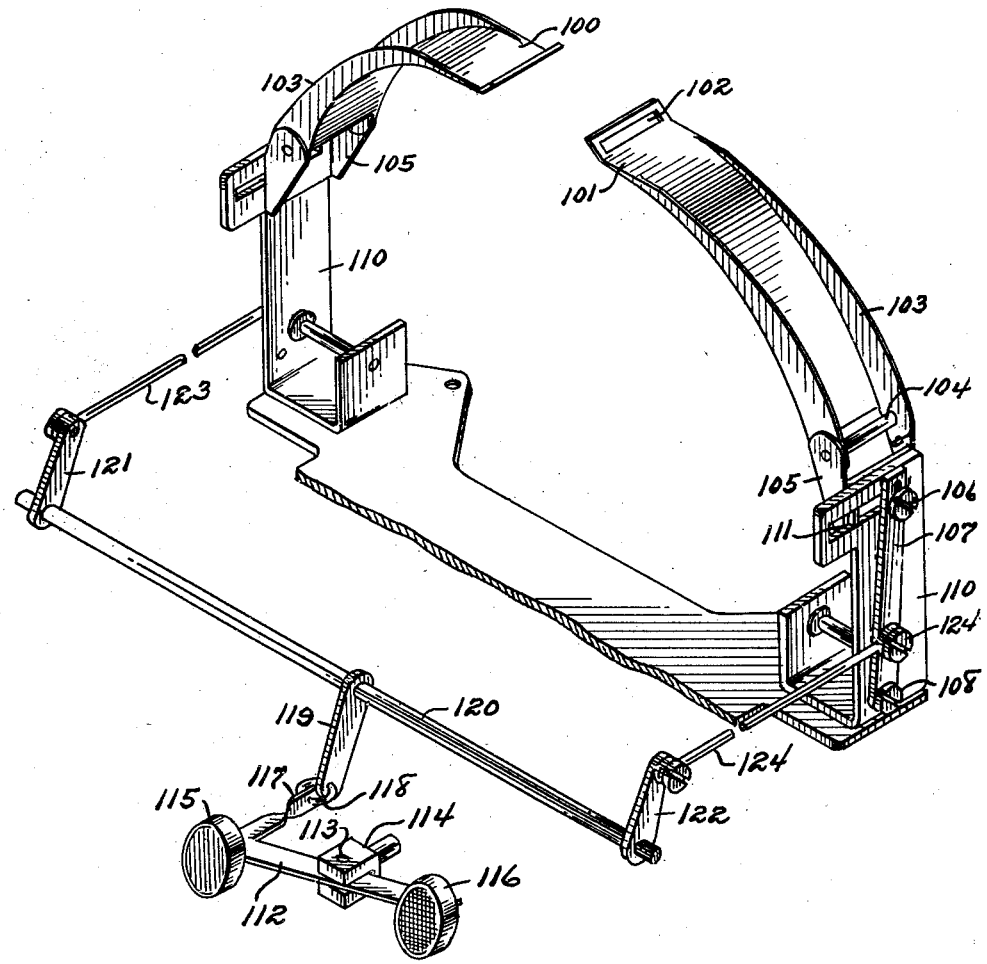
Figure 18 is a perspective view of the ribbon guides and mechanism for shifting the ribbon, in order to change the color of the ink.

The main arms or guide for the ribbon, as it passes above the platen, are shown especially in Figures 16, 17, 18, these arms being designated 100, 101, and having slots 102 near their upper ends, the ribbon passing thru the slots at a point above the platen. These arms are segmental in form, or suitably curved, and are provided with flanges 103, a pivotal mounting being illustrated at 104.

The ribbon may include portions of different color, and in order to change the colors, or change from black to red for instance, arms 100, 101 are carried by brackets 105 mounted by screws 106 passing thru arms 107 pivoted at 108 on bracket 110, each providing a type of standard.

At the front of the machine I mount a lever 112 which is pivoted at 113 in bracket 114, and this lever or arm 112 carries keys or the like designated 115, 116 on which the different colors, corresponding with the colors on the ribbon, are indicated.

Lever 112 includes an offset element 117 connected by a link or ring 118 with arm 119 rigid with rock shaft 120, the latter carrying end crank arms 121, 122 which have pivotal connection with rods 123, 124, and the latter are to be pivotally connected with arms 107, the connection being effected by means of screws 124', or in any suitable manner.

An inspection of the drawings and especially of Figure 18, will be sufficient to show that upon pressing the required key 115 or 116, the arms 107 will be moved in the direction required for carrying with them the arms 100, 101 over which the ribbon passes, the latter moving thru slots 102.

With reference to the normal feeding movement of the ribbon, it will be observed from Figure 17 that the element 80 is provided with slots 80' permitting of sliding movement with reference to headed screws or the like 80'', by which the element 80 is mounted. It will be recalled that this member 80 carries the spring 81 of Figure 27, constituting a feeding pawl, for advancing the ribbon.

When a full line is written by the operator the platen rotates thru one complete revolution, and a circular scale 130 is carried by the forward end of the platen, a pointer 131 cooperating with the scale and being mounted on a stationary element of the carriage.

Figure 15:
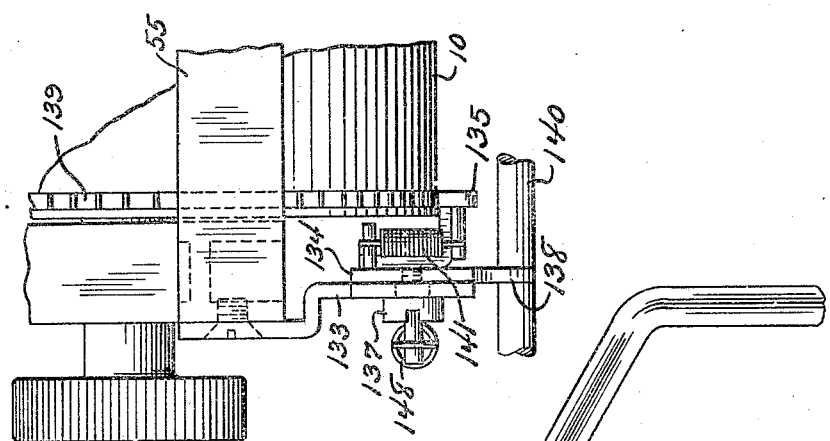
Figure 15 is a fragmentary view, in top plan, showing the same mechanism.
Figure 14:
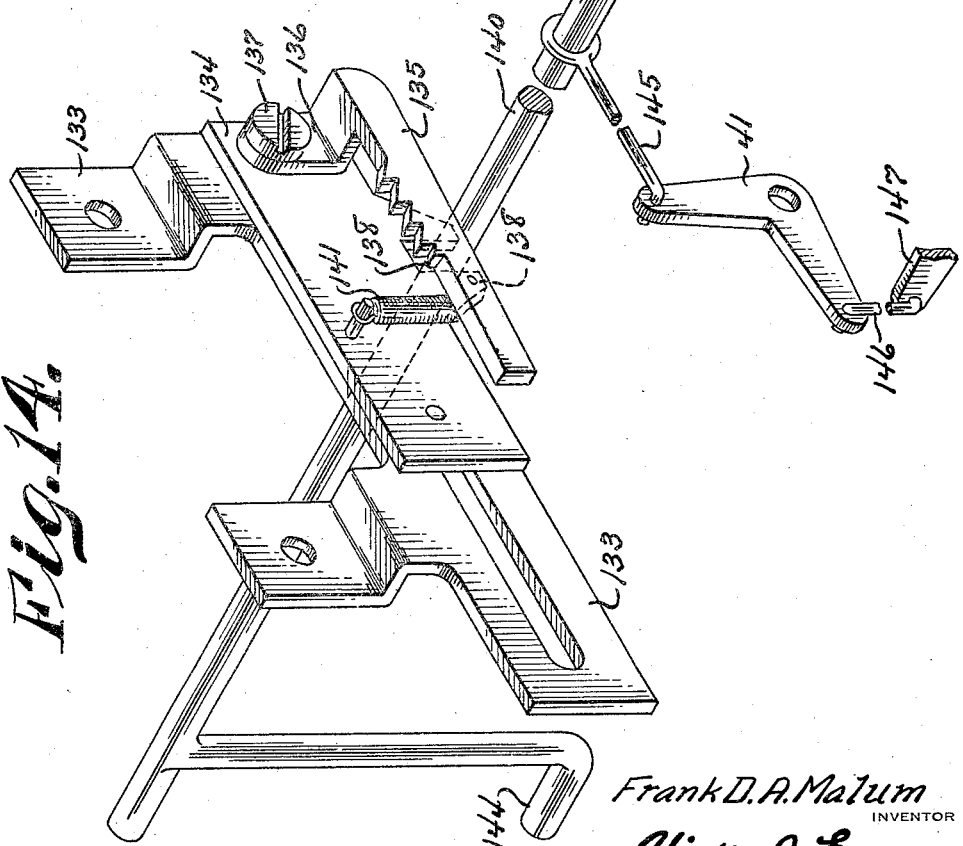
Figure 14 is a perspective showing the structure of the line completing mechanism.

Before moving the carriage longitudinally in order to start a new line, the complete rotation of the platen must be effected, and if the words written do not complete a line, this operation is effected by means of the structure shown in Figures 12 and 14, and further illustrated in Figure 15. An end bracket 133 carried by the carriage slidably mounts a plate 134 carrying a rack 135 having an offset portion 136 thereon which permits of pivotal mounting on plate 134, by means of screw 137. Plate 134 includes a slotted portion 138 engaged by bail 140, and when the latter is operated or swung, the teeth of the rack 135 engage the teeth of ratchet wheel 139, and advance the wheel and the platen a sufficient distance to complete the normal movement of the platen, and render the line spacing mechanism operative. Rack 135 is held resiliently against the ratchet wheel by means of spring 141, permitting the platen to move independently of this special feeding mechanism.

Bail 140 having end members such as 144, permitting mounting for swinging movement, is controlled by rod 145 of Figure 14 operated by a bell crank lever such as 41, with which a rod 146 is connected, the latter having pivotal connection with lever 147. Spring 141 insures the return of the rack to proper or normal position.

The carriage is moved longitudinally, under the action of a spring to be housed in spring barrel 150 of Figure 29, and the tension of the spring may be controlled by wheel 151 carrying ratchet teeth with which the holding pawl 152 cooperates. The flexible member 153 is to be connected with the spring, and to be connected by means of loop member 154 with an element on the frame of the carriage.

Figure 22:
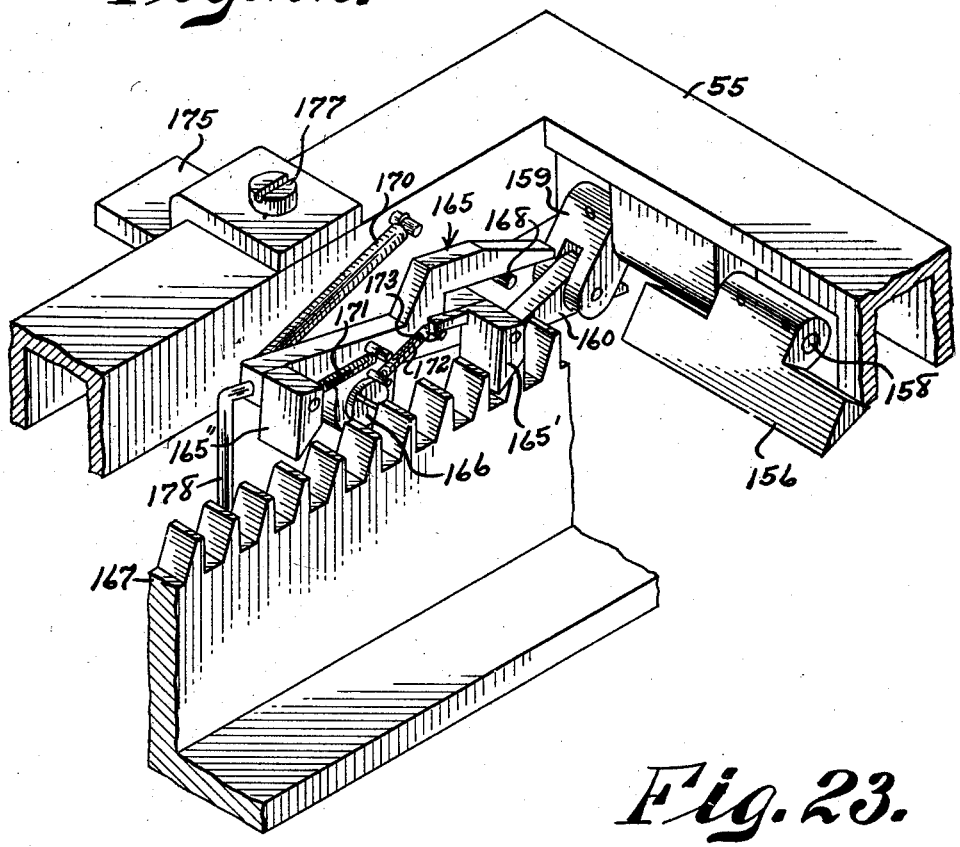
Figure 22 is a perspective view of the escapement mechanism, showing a portion of the carriage and rack bar.
Figure 23:
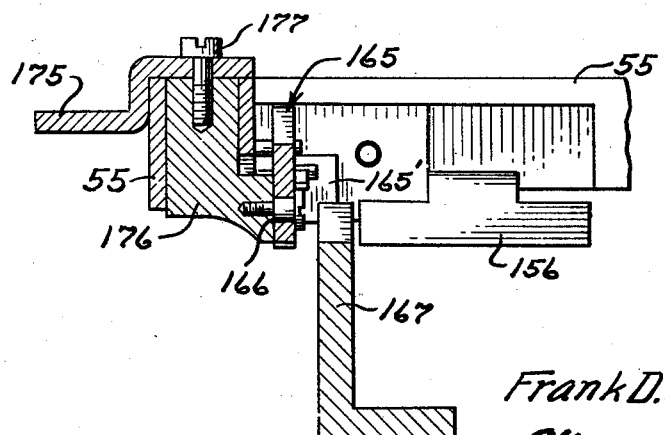
Figure 23 is a section on line 23—23 of Figure 9.

When a line has been typed, and has been completed in that manner or by the further rotation of the platen by the operation of the rack bar 135, a pin 155, of Figure 12 and elsewhere, carried by the end of the platen, lifts dog 156 shown especially in Figures 12 and 22, and the latter is mounted on a short shaft or spindle 158 carrying on its opposite end a bracket or arm 159 carrying a dog 160 pivoted thereon, and these elements constitute a portion of the carriage escapement mechanism, for line spacing, so that when the carriage is released by the mechanism of Figures 8, 9, 22, etc., the carriage moves longitudinally the distance between two adjacent lines to be written on the paper carried by the platen.

Element 165 will be termed the escapement per se, this member being pivotally mounted at 166 and including the tooth 165' for cooperation with main rack 167. A stop 168 limits the movement of escapement 165, and the latter also carries a tooth or dog 165'', on that side of the pivotal point 166 opposite to that carrying the element 165'. A spring 170 tends to hold the escapement 165 in the position of Figure 22, and springs 171 and 172 are connected indirectly with teeth or pawls 165'', 165', and the movement of these elements last named is limited by stops such as 173.

An important feature of the construction is that main rack 167 is stationary with reference to the frame of the machine, and the outer structure constituting the movable elements of Figure 22, moves with the carriage, a portion of the frame of which is designated 55. It is of course now fully understood that the escapement mechanism is for line spacing, incident to the longitudinal movement of the carriage and platen.

A manually operated device 175 is movable vertically with reference to the frame of the carriage, and is rigid with block or the like 176, being secured thereto by screw 177, or otherwise secured. This device permits of the release of the escapement from the rack 167, when shifting the carriage manually for a considerable distance. The escapement 165 has connected therewith a rod 178 having a loop 178' (see Figures 9 and 22), the loop member being slidable along rail 178''.

Rod 178 will release escapement 165 providing a blank line or lines between two lines to be typed, if rail 178'' is operated thru the medium of a rod, adapted for control thru bell crank 41b and an operating member or knob 178a on the front of the machine, and shown in Figure 1.

For the release of the paper from the platen 10, thumb or finger members are provided at 180 and 181 as shown in Figure 7 and elsewhere, and the paper is normally held in correct position with reference to the platen by approximately circular bands 182, 183 mounting rollers such as 184 in ears such as 185.

The end radial elements 186 at opposite ends of the platen, and mounted on the carriage end blocks 63, 64, are connected by bars 188 extending longitudinally of the platen, and the temporary release of the paper holding devices 182, and 183 is effected by the operation of either element 180 or 181 and of cam member or members 190, pivoted at 191 and adapted to engage a resiliently held member 192 for forcing the latter outwardly and freeing the paper sheet. A stop 194 serves an obvious purpose.

Bell 195 is sounded by hammer 196 mounted on spring held bell crank 197 tripped by pin 198 on the end of the platen, and positioned to come into action prior to the completion of each rotation, representing a single line.

Having thus described the invention what is claimed is:—

1. In a typewriting machine, a plurality of series of type bars, a carriage movable between the series, a rotary platen mounted on the carriage, a single lever arm and devices thereon for rotating the platen in opposite directions for spacing the letters of a line to be written, means for actuating said lever at each printing operation, and means for moving the carriage perpendicularly of the path in which the letters of each line are written, for spacing the lines.

2. In a typewriting machine, a plurality of series of type bars, a carriage movable between the series, a rotary platen mounted on the carriage, a single lever arm and devices thereon for rotating the platen in opposite directions for spacing the letters of a line to be written, means for actuating said lever at each printing operation, means for completing the rotation of the platen when a written line is of less than normal length, and means for moving the carriage perpendicularly of the path in which the letters of each line are written, for spacing the lines.

3. In a typewriting machine, a plurality of series of type bars, a carriage movable between the series, a rotary platen mounted on the carriage, a single lever arm and devices thereon for rotating the platen in opposite directions for spacing the letters of a line to be written, means including a wheel rigid with the platen, an element for engaging said wheel, and mounting means for this element, the latter and its mounting means being movable independently of carriage movement for completing the rotation of the platen when a written line is of less than normal length, and means for moving the carriage perpendicularly of the path in which the letters of each line are written, for spacing the lines.

4. In a typewriting machine, a plurality of series of type bars, upper and lower case type carried by each bar, a carriage movable between the series of type bars, a rotary platen mounted on the carriage, means for shifting the carriage and platen to position for printing upper and lower case characters, a single lever arm and devices thereon for rotating the platen in opposite directions for spacing the letters of a line to be written, and means for moving the carriage perpendicularly of the path in which the letters of each line are written, for spacing the lines.

5. In a typewriting machine, a plurality of series of type bars, upper and lower case type carried by each bar, a carriage movable between the series of type bars, a rotary platen mounted on the carriage, means for shifting the carriage and platen to position for printing upper and lower case characters, a single lever arm and devices thereon for rotating the platen in opposite directions for spacing the letters of a line to be written, means for completing a revolution of the platen when a written line is of less than normal length, these means including a pivoted element having slidable movement, and a wheel rigid with the platen and engaged by the pivoted element, and means for moving the carriage perpendicularly of the path in which the letters of each line are written, for spacing the lines.

6. In a typewriting machine, a plurality of type bars, a carriage, a rotary platen mounted on the carriage, a single lever arm and devices pivoted thereon in reverse relation for rotating the platen in opposite directions, and automatic means including elements movable respectively in a circular path and angularly across that path, for moving the carriage longitudinally in the direction of the axis of the platen, for line spacing.

In testimony whereof I affix my signature.

FRANK D. A. MALUM.